May 27, 1969

D. E. BENDER ET AL 3,446,017

FAILSAFE SWITCH FOR GAS GENERATOR

Filed Nov. 22, 1966

INVENTORS:
DONALD E. BENDER
DAVID H. DOIRON
BY
H. Samuel Kiese
ATTORNEY

INVENTORS.
DONALD E. BENDER
DAVID H. DOIRON
BY
H. Samuel Kieser
ATTORNEY

United States Patent Office 3,446,017
Patented May 27, 1969

3,446,017
FAIL-SAFE SWITCH FOR GAS GENERATOR
Donald E. Bender, Herrin, and David H. Doiron, Red Bud, Ill., assignors to Olin Mathieson Chemical Corporation, a corporation of Virginia
Filed Nov. 22, 1966, Ser. No. 596,153
Int. Cl. F02g 3/00; F02k 9/04
U.S. Cl. 60—39.47          11 Claims

ABSTRACT OF THE DISCLOSURE

A gas generator having a cylindrical solid fuel charge, an igniter, a source of electrical energy and a fail-safe switch positioned about the circumference of said fuel charge and electrically connected to said igniter and said source of electrical energy, said switch being responsive to the expansion of said fuel charge upon an increase in ambient temperature for breaking the connection between said igniter and said source of electrical energy.

---

This invention relates generally to gas-generating devices, and more particularly to a fail-safe switch for gas-generating devices utilizing ammonium nitrate based propellants.

Gas generators in which solid gas-generating charges are employed are used as a source of power for the operation of prime movers such as internal combustion engines, motor starters, switch closures, jet engine starters, and the like. Such generators are usually formed of a cylindrical case closed at one end and open at the opposite end. The case contains an igniter and a solid gas-generating charge of a suitable design. Recently, such generating charges consist of ammonium nitrate granules embedded in a matrix of a resinous or plastic binder.

In many instances, such generating units are exposed to severe atmospheric humidity and/or undergo continued exposure to radical changes in temperature. For example, a generating unit for starting jet engines may be stored aboard a high-flying aircraft which operates from a base located in a desert area. Under these conditions, it is possible for the starter cartridge to experience many temperature changes varying from —65° F. to +160° F. A possible result of this exposure is a propellant surface density decrease causing the propellant grain to swell or increase in volume. As the propellant grain is designed to produce a given volume of gas at a prescribed temperature and pressure under normal conditions, when the swelling occurs, there will be a change in the programmed pressures. In many instances, the grain will burn in an uncontrolled manner and in some instances, produce a pressure exceeding the capability of the containing vessel resulting in an explosion which could cause injury to the personnel or damage to the equipment in the immediate area.

Since the propellant grains are contained in metal or opaque cases, the only way to determine if a grain has swollen beyond the critical amount is to X-ray the unit or dissemination thereof. However, these approaches are impractical because of the high usage of the solid propellant devices.

Therefore, it is an object of this invention to provide means for preventing the uncontrolled burning of a gas-generating device.

More specifically, it is an object of this invention to provide means for preventing the ignition of a gas-generating device which has been subjected to temperature and environmental changes.

Yet another object of this invention is to provide means for preventing the burning of a swollen propellant which is easily adaptable for use with conventional gas-generating devices having an end-restricted ammonium nitrate based grain.

A further object of this invention is to provide means for preventing the ignition of a swollen propellant grain which can be easily incorporated into the design of each cartridge as part of the cartridge unit.

These and other objects of the invention may be accomplished through the provision of electric contact expansion means electrically connected to the ignition circuit of a gas-generating device. Such means may be in the form of a band placed about the circumference of a gas-generating charge and designed to open the ignition circuit after the propellant grain has expanded a predetermined amount.

A more complete understanding of these and other features of the invention will be gained from a consideration of the following description and from the accompanying drawings in which.

Figure 1:
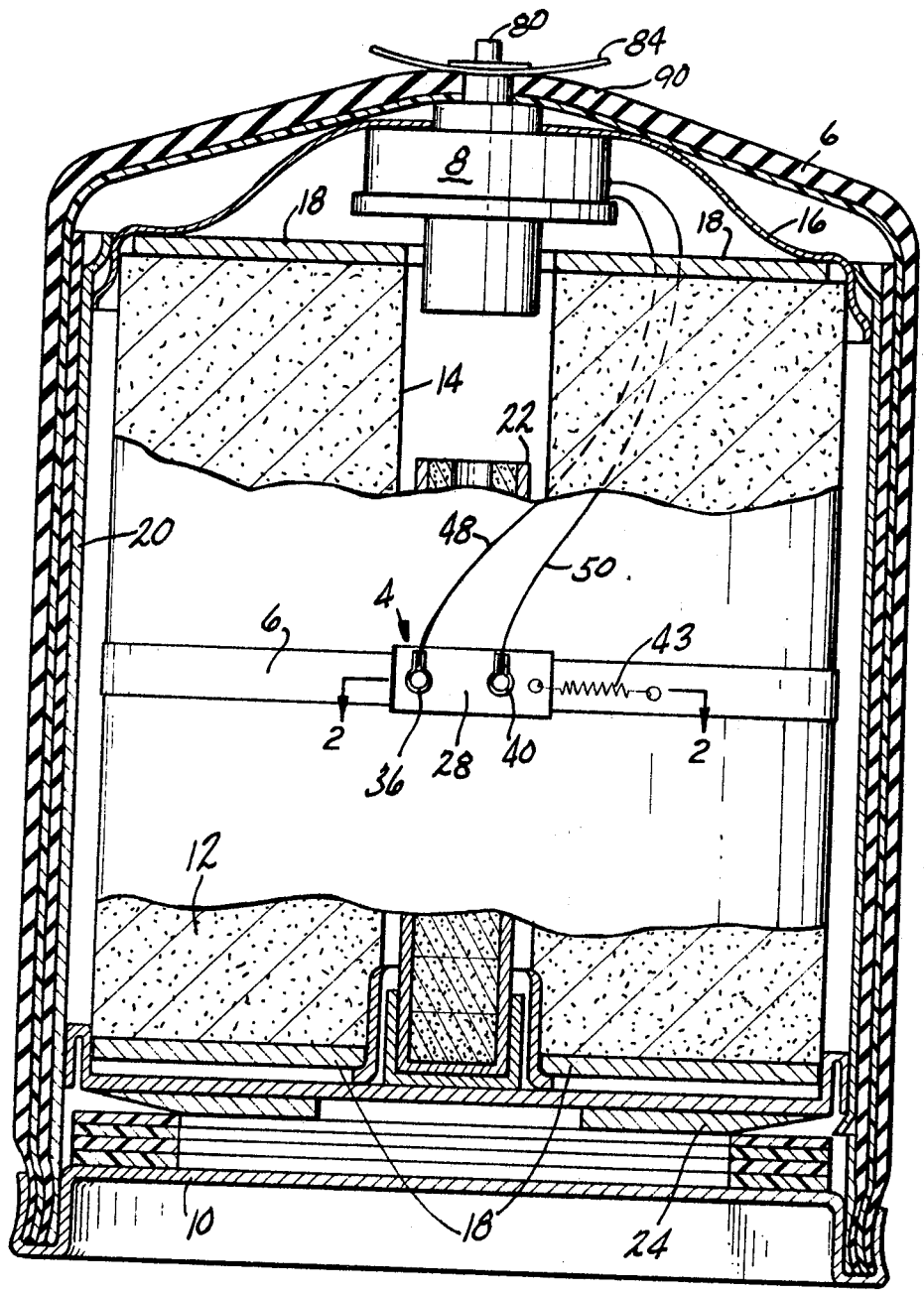
FIGURE 1 is a side elevational view, partly in section, of a gas-generator cartridge provided with the failsafe switch of the present invention.
Figure 2:
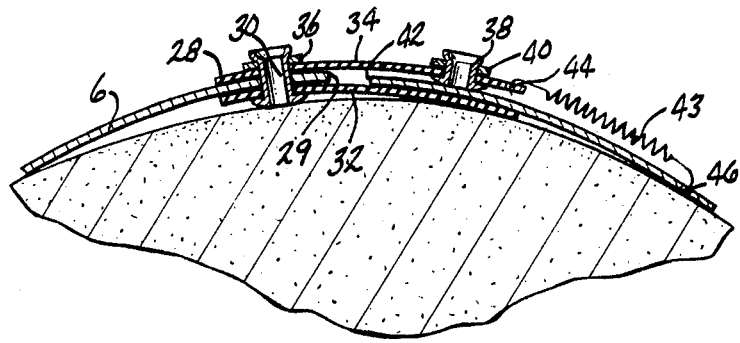
FIGURE 2 is an enlarged cross sectional view taken along the lines 2—2 of FIGURE 1.
Figure 3:
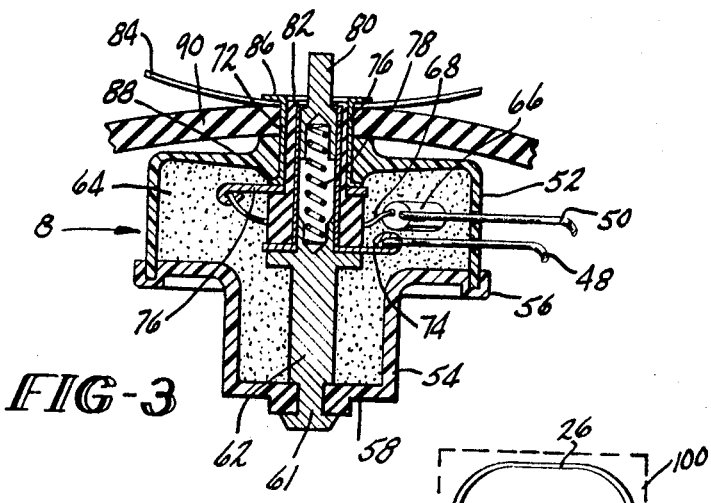
FIGURE 3 is an enlarged sectional view of the igniter assembly of the cartridge of FIGURE 1.

Referring to the drawings, a typical gas-generator cartridge 2, which may be provided with the failsafe switch means 4 of the present invention, may include generally a cartridge case 6 having an igniter assembly 8 positioned at one end thereof and the opposite end closed by a perforated case cover 10. A suitable propellant grain 12 having a central perforation 14 may be positioned within the cartridge case 6 and held in position by suitable flange means 16. The ends of the propellant grain 12 are coated with a suitable flame restrictor 18 to prevent combustion of the surfaces.

Flange means 16 extends into a flame shield 20 which surrounds the internal surface of the case 6 to decrease exposure of the case 6 to high temperatures. A sustainer 22, having a fast-burning propellant system at the end of the grain 12 opposite the igniter assembly 8 and extends upwardly into the perforation 14 into a position to be ignited by the igniter assembly 8 to provide a flame for permitting continuous combustion of the propellant grain 12 along the perforation at its central longitudinal axis. The sustainer 22 also assists in directing the flame and gas to the outer periphery of the propellant grain 12 by acting as a barrier to gas and flame flow through the perforation to the discharge end of the gas generator. Spacing means 24 is positioned between the bottom cover 10 and propellant grain 12, as well as between the sustainer 22 and internal cylindrical surface of the grain 12. The spacing means 24, together with the flange means 16, properly positions the respective components.

The failsafe switch means 4 includes a band 26 of electrically conductive material such as metal circumferentially wrapped around the center of the grain in the manner shown in FIGURE 1. An insulator 28 is attached to the band 26 at a point adjacent end 29 by means of an eyelet 30. The insulator 28 may consist of any suitable nonconducting material such as insulating paper or the like, folded over with the eyelet 30 passing through both the inside flap 32 and outside flap 34. A wire connector 36 is attached to the eyelet 30 so that an electrical connection is provided between the wire connector 36, eyelet 30 and band 26.

The insulator 28 includes a second eyelet 38 extending through only the outside flap 34 of insulator 28 with the head portion of the eyelet 38 on the inside thereof. A second wire connector 40 is connected to eyelet 38 and positioned on the outside of the outside flap 34 of the insulator 28. The other end 42 of the band 26 is positioned between the two flaps of the insulator 28. In its normal position, the outside surface of band 26 adjacent end 42 thereof is in contact with the head of eyelet 38. A suitable coil spring 43 extends between a suitable opening 44 in the outside flap 34 of the insulator 28 and an opening 46 in the band 26 whereby the two ends of the band 26 are urged toward each other and the band is kept in tight engagement with the propellant grain 12.

Lead wires 48 and 50 are electrically connected to wire connectors 36 and 40 respectively and extend up into the igniter assembly 8 wherein they are electrically connected in the manner to be hereinafter described.

The igniter assembly 8 may consist of any conventional igniter such as, for example, the one shown and described in the Perkins et al. patent, No. 2,979,896. In accordance with the disclosure of that patent, the igniter assembly 8 includes a polyethylene box or cup 52 closed with a lid 54. The lid is provided with a snap brim 56 about its periphery and a thick boss 58 about its small cylindrical opening 60. The snap brim 56 engages the open end of the cup 52 and the boss 58 is positioned about the collar button rivet 61 of spring retainer 62.

The cup 52 contains a charge 64 and an electrical squib 66. A lead wire 68 electrically connects one terminal of the squib 66 to the terminal clip 70 which is mounted to contact an eyelet rivet 72. Lead wire 50, from wire connector 40 of the failsafe switch means 4, is connected to the other terminal of the squib 66. The lead wire 48 coming from the wire connector 36 of the failsafe switch means 4 is connected to terminal clip 74 which is mounted to contact the hollow contact post 76.

The contact post 76 forms a spring housing tube for pin spring 78 pushing on contact pin plunger 80 to form a contact unit consisting of parts 62, 76, 78 and 80. If desired, this contact unit could consist of one solid piece. This unit is electrically insulated by sleeve 82 from the other unit consisting of eyelet 72 and spring contact bar 84 which forms the ground contact. One flange 86 of eyelet 72, together with the other flange 88, holds the loaded cup 52 and the electrical contact units including spring contact bar 84 all together about a perforation at the peak of the dome 90 of the cartridge case 10. When the cartridge unit is placed in a suitable breech mechanism (not shown), the igniter electrode of the breech mechanism is adapted to contact the pin plunger 80 of the igniter assembly 8. The ground contact 84 is adapted to contact the casing of the breech mechanism.

Figure 4:
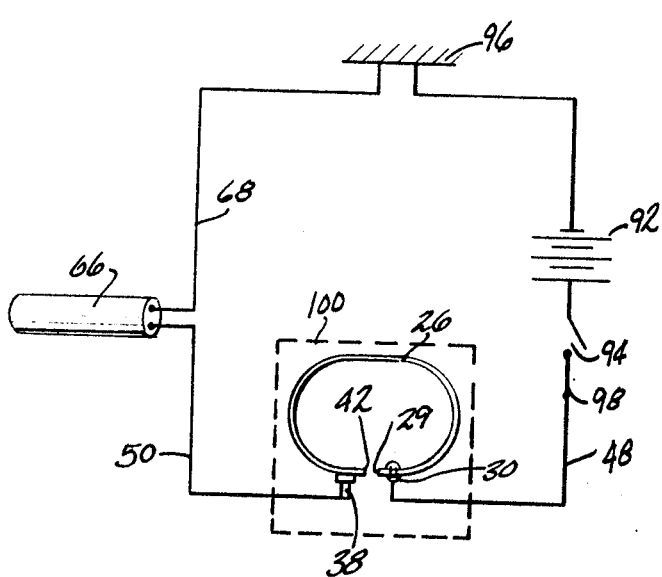
FIGURE 4 is a schematic circuit diagram of the failsafe switch and igniter with the failsafe switch in the closed position.

The above-described electrical connections and their function will become more apparent by reference to FIGURE 4 wherein the electrical circuit is shown schematically. The power source 92 and ignition switch 94 are external of the cartridge case and are electrically positioned in the circuit in series between ground 96 and point 98. Point 98 represents the pin plunger of the igniter assembly. The failsafe switch means is shown by box 100 with eyelet 30 shown connected adjacent end 29 of band 26 and eyelet 38 having its head portion in electrical contact with band 26 adjacent end 42 thereof. Eyelet 30 is electrically connected to point 98 by lead wire 48. Squib 66 is positioned in the circuit with one terminal connected to ground by lead wire 68 and the other terminal connected to eyelet 38 by lead wire 50. Thus, a circuit is provided with the power source 92 and ignition switch 94 connected in series to the failsafe switch means 4 which is in series with squib 66 and ground.

When the switch 94 is closed, and both eyelets 30 and 38 are in contact with the band 26, the firing circuit will be complete and the squib 66 will set off the igniter charge 64 to completely disintegrate the lid 54 and cup 52 to commence ignition of the sustainer 22 as well as the exterior and interior walls of the propellant grain 12.

Figure 5:
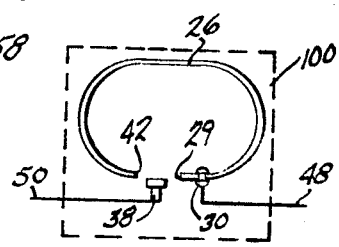
FIGURE 5 is a schematic diagram of the failsafe switch as shown in FIGURE 4, but showing the switch in its open position.

However, if prior to firing of the ignition assembly 8, the propellant grain 12 should swell beyond a predetermined amount, the ends 29 and 42 of the band 26 will move away from each other and end 42 will move out of contact with eyelet 38 as shown in FIGURE 5. If this swelling should occur, even if the switch 94 of the firing circuit should be closed, the electrical contact between band 26 and eyelet 38 will be broken with the result that the ignition circuit will be open and the squib 66 will not be activated.

It is to be understood that the distance between the end 42 of band 26 and the head of eyelet 38 controls the amount of grain swelling which can be tolerated before the circuit is opened. Although this distance will vary depending upon the composition of the propellant grain, as well as the size thereof, it has been found that with most ammonium nitrate based propellants, a 2.4 percent growth is the maximum tolerated.

It will thus be seen that in accordance with this invention, a failsafe switch has been provided which may be used in conjunction with any end-restricted, sidewall-burning propellant grain which is subject to failure if ignited after a propellant grain which is subject to failure if ignited after a predetermined amount of expansion. In addition, such switch is easy to assemble and takes advantage of existing igniter designs with only slight wiring modifications. The present switch is substantially foolproof and prevents actuation of the cartridge when an undesirable condition is present even when the ignition switch is closed.

It is to be understood that various modifications and alterations will readily suggest themselves to persons skilled in the art. It is intended, therefore, that the foregoing description be considered as exemplary only, and that the scope of this invention be ascertained from the following claims.

What is claimed is:
1. A failsafe switch for use with a solid propellant to prevent the ignition thereof upon actuation of an ignition circuit when said propellant has expanded beyond a predetermined amount comprising:
 (a) electrically conductive expansion sensing means adapted to extend about the circumference of a propellant.
 (b) electrical contact means having sliding engagement with said sensing means,
 (c) first electrical connector means for electrically connecting said sensing means to an ignition circuit, and
 (d) second electrical connector means for electrically connecting said contact means to an ignition circuit, said first and second electrical connector means adapted to connect said switch means in series in an ignition circuit, said expansion sensing means normally contacting said contact means to provide a closed electrical circuit including said first connector means, said sensing means, said contact means, and said second connector means, and being adapted to move out of engagement with said contact means upon predetermined expansion of said propellant.

2. In combination, a solid propellant and a failsafe switch to prevent the ignition of the solid propellant upon actuation of an ignition circuit when said propellant has expanded beyond a predetermined amount, said failsafe switch comprising:
 (a) electrically conductive expansion sensing means extending about the circumference of said propellant,
 (b) electrical contact means having sliding engagement with said sensing means,
 (c) first electrical connector means for electrically connecting said sensing means to an ignition circuit, and
 (d) second electrical connector means for electrically connecting said contact means to an ignition circuit, said first and second electrical connector means adapted to connect said switch in series in an ignition circuit, said expansion sensing means normally contacting said contact means to provide a closed electrical circuit including said first contact means, said sensing means, said contact means, and said second connector means, and being adapted to move out of engagement with said contact means upon predetermined expansion of said propellant.

3. The combination of claim 2 wherein said electrical sensing means comprises a split metallic band extending about the circumference of said propellant and having first and second end portions spaced from each other, said first electrical connector means being attached to said band adjacent said first end portion and said electrical contact means normally contacting said band adjacent said second end portion.

4. The combination of claim 3 further comprising insulator means for preventing radially outward movement of said ends and means biasing said first and second ends circumferentially toward each other.

5. The combination of claim 4 wherein said first electrical connector means includes a first eyelet connected to said insulator means and said band adjacent said first end thereof and said electrical contact means includes a secod eyelet connected to said insulator and extending into engagement with said band adjacent the second end thereof.

6. The combination of claim 5 wherein said insulator includes an envelope having an inside flap and an outside flap, said first and second end portions extending between said flaps, said first connector means extending through both said flaps and said barrel adjacent the first end thereof, and said contact means extending through only one of said flaps.

7. The combination of claim 6 wherein said propellant comprises ammonium nitrate embedded in a matrix of binder material.

8. The combination of claim 7 wherein said propellant is cylindrical and the ends thereof are restricted.

9. A gas-generating device comprising a solid propellant, an igniter for igniting said propellant upon actuation of an ignition circuit, and a failsafe switch for preventing the ignition of said igniter upon actuation of said ignition circuit when said propellant has expanded beyond a predetermined amount, said failsafe switch including electrically conductive expansion sensing means extending about the circumference of said propellant, electrical contact means having sliding engagement with said sensing means, first electrical connector means for electrically connecting said sensing means to said igniter, second electrical connector means for electrically connecting said contact means to said igniter, said first and second electrical connector means being arranged to connect said switch in series with said igniter, said expansion sensing means normally contacting said contact means to provide a closed electrical circuit including said igniter, said first connector means, said sensing means, said contact means, and said second connector means, and being adapted to move out of engagement with said contact means upon predetermined expansion of said propellant.

10. The gas-generating device of claim 9 wherein said electrical sensing means comprises a split metallic band extending about the circumference of said propellant and having first and second end portions spaced from each other, said first electrical connector means being attached to said band adjacent said first end portion and said electrical contact means normally contacting said band adjacent said second end portion.

11. The combination of claim 10 wherein said igniter includes a ground terminal, an electrode adapted to electrically connect said igniter to an external ignition circuit, and a squib, one terminal of said squib being electrically connected to said ground terminal, said second electrical connector means being electrically connected to the second terminal of said squib, and said first electrical connector means being electrically connected to said electrode.

References Cited

UNITED STATES PATENTS

| | | | |
|---|---|---|---|
| 2,942,547 | 6/1960 | Rabern et al. | 60—256 XR |
| 2,979,896 | 4/1961 | Perkins et al. | 102—39 |
| 3,143,853 | 8/1964 | Sobey | 60—254 |

CARLTON R. CROYLE, *Primary Examiner.*

U.S. Cl. X.R.

60—39.82, 256; 102—49.7